United States Patent [19]
Appel et al.

[11] Patent Number: 5,204,523
[45] Date of Patent: Apr. 20, 1993

[54] METHOD FOR SPOT POSITION CONTROL IN AN OPTICAL OUTPUT DEVICE EMPLOYING A VARIABLE WAVELENGTH LIGHT SOURCE AND AN OPTICAL BEAM DEFLECTING ELEMENT

[75] Inventors: James J. Appel, Brighton, N.Y.; Thomas L. Paoli, Los Altos, Calif.

[73] Assignee: Xerox Corporation, Stamford, Conn.

[21] Appl. No.: 747,889

[22] Filed: Aug. 19, 1991

[51] Int. Cl.[5] ............................................. H01J 5/16
[52] U.S. Cl. .................................. 250/236; 358/481
[58] Field of Search ............... 250/235, 236, 234, 205; 358/475, 480, 481, 225, 484; 359/245, 265, 217

[56] References Cited

U.S. PATENT DOCUMENTS

| | | | |
|---|---|---|---|
| 4,040,096 | 8/1977 | Starkweather | 358/302 |
| 4,250,465 | 2/1981 | Leib | 331/94.5 D |
| 4,600,837 | 7/1986 | DiStefano et al. | 250/235 |
| 4,638,334 | 1/1987 | Burnham et al. | 346/108 |
| 4,651,169 | 3/1987 | Muka | 346/108 |
| 4,651,170 | 3/1987 | Chandler et al. | 346/108 |
| 4,724,314 | 2/1988 | Caimi | 250/205 |
| 4,962,057 | 10/1990 | Epler et al. | 437/81 |
| 4,971,413 | 11/1990 | Inoue | 250/236 |
| 5,089,908 | 2/1992 | Jodoin et al. | 250/236 |
| 5,103,334 | 4/1992 | Swanberg | 250/235 |

OTHER PUBLICATIONS

Bestenreiner, F., U. Greis, J. Helmberger, and K. Stadler, *Visibility and Correction of Periodic Interference Structures in Line-by-Line Recorded Images*, Journal of Applied Photographic Engineering, 2:2, Spring 1976, pp. 86–92.

Filinski, I. and T. Skettrup, *Fast Dispersive Beam Deflectors and Modulators*, IEEE Journal of Quantum Electronics, QE-18:7, Jul. 1982, pp. 1059–1962.

Urbach, John C., Tibor S. Fisli, and Gary K. Starkweather, *Laser Scanning for Electronic Printing*, Proceedings of the IEEE, 70:6, Jun. 1982, pp. 597–618.

Sprague, Robert A., John C. Urbach, and Tibor S. Fisli, *Advances in Laser and E-O Printing Technology*, Laser Focus/Electro-Optics, Oct. 1983, pp. 101–109.

Born, Max, and Emil Wolf, et al., Principles of Optics, 5th Ed., 1975, Pergamon Press, New York, pp. 177–180; and pages 405–407.

(List continued on next page.)

Primary Examiner—David C. Nelms
Assistant Examiner—Que T. Le
Attorney, Agent, or Firm—Jonathan A. Small; John M. Kelly

[57] ABSTRACT

In an optical output device wherein a beam of light is generated and focused to a spot upon an image plane, such as a photoreceptor in a xerographic printing apparatus, an method for controlling the position of the spot in the slow scan direction of the image plane including the steps of generating a beam of light, deflecting the beam of light by way of an optical beam deflecting elements such that the optical beam deflecting element deflects the path of the beam of light by an amount that is determined by the wavelength of the light beam, and varying the wavelength of the beam of light such that the amount that the beam of light is deflected by the optical beam deflecting element is varied to achieve control of the position of the spot at which the beam of light is incident on the image plane in the slow scan direction. The invention may be embodied in an apparatus which includes a light source capable of emitting the beam of light at a selected one of at least two selectable wavelengths and prism for refracting the beam of light an amount which depends on the wavelength of the beam of light, the amount of refraction determining the position of the spot in the slow scan direction on the image plane. The light source may be of the solid state laser type, and may emit a plurality of beams of light the spots from which may be individually or together selectively positioned in the slow scan direction on the image plane. The beam deflecting element may be a semiconductor prism, for example of AlGaAs, and have a controllable bias applied thereto to allow further control of spot positioning.

7 Claims, 10 Drawing Sheets

OTHER PUBLICATIONS

Kaminow, Ivan P., *Measurements of the Electrooptic Effect in CdS, ZnTe, and GaAs at 10.6 Microns*, IEEE Journal of Quantum Electronics, QE-4:1, Jan. 1968, pp. 23-26.

Houghton, A. J. N., P. M. Rodgers and D. A. Andrews, *High-Performance GaAs-GaAlAs Phase Modulators for PSK Optical Fibre Systems*, Electronics Letters, May 24, 1984, 20:11, pp. 479-481.

Simes, R. J., R. H. Yan, R. S., Geels, L. A. Coldren, J. H. English, A. C. Gossard, and D. G. Lishan, *Electrically Tunable Fabry-Perot Mirror Using Multiple Quantum Well Index Modulation*, Applied Physics Letters, 53:8, Aug. 22, 1988, pp. 637-639.

Casey, H. C. Jr., D. D. Sell, and M. B. Panish, *Refractive Index of $Al_xGa_{1-x}As$ Between 1.2 and 1.8 eV*, Applied Physics Letters, 24:2, Jan. 15, 1974, pp. 63-65.

Casey, H. C. Jr. and M. B. Panish, Heterostructure Lasers: Part A, Academic Press, New York, 1978, p. 31.

METHOD FOR SPOT POSITION CONTROL IN AN OPTICAL OUTPUT DEVICE EMPLOYING A VARIABLE WAVELENGTH LIGHT SOURCE AND AN OPTICAL BEAM DEFLECTING ELEMENT

BACKGROUND OF THE INVENTION

The present invention relates generally to the field of optical output devices, and more specifically to a method of providing position or registration control of a laser spot or spots, which is achieved by varying the output wavelength of the device's light source.

The present application relates to the following concurrently filed U.S. patent applications: Ser. Nos. 07/747,166; 07/747,039; and 07/747,176. Each of these applications is hereby incorporated by reference.

Although applicable to a wide variety of optical output devices, the present invention finds particular utility in Raster Output Scanning (ROS) apparatus. Therefore, the following details and descriptions begin with a background of the present invention in terms of ROS apparatus. ROS has become the predominant method for imparting modulated light information onto the photoreceptor in printing apparatus used, for example, in digital printing, and has found some application in other image forming operations such as writing to a display, to photographic film, etc. Consider, for illustration purposes, what is perhaps the most common application of ROS, digital printing. As is known, the scanning aspect thereof is conventionally carried out by a moving reflective surface, which is typically a multifaceted polygon with one or more facets being mirrors. The polygon is rotated about an axis while an intensity-modulated light beam, typically laser light, is brought to bear on the rotating polygon at a predetermined angle. The light beam is reflected by a facet and thereafter focussed to a "spot" on a photosensitive recording medium. The rotation of the polygon causes the spot to scan linearly across the photosensitive medium in a fast scan (i.e., line scan) direction. Meanwhile, the photosensitive medium is advanced relatively more slowly than the rate of the fast scan in a slow scan direction which is orthogonal to the fast scan direction. In this way, the beam scans the recording medium in a raster scanning pattern. (Although, for the purposes of example, this discussion is in terms of ROS apparatus, as will become apparent from the following discussion there exists many other scanning and non-scanning system embodiments of the present invention. However, as a convention, the word "scan" when referring to fast and slow scan directions will be used with the understanding that actual scanning of the spot is not absolutely required.) The light beam is intensity-modulated in accordance with a serial data stream at a rate such that individual picture elements ("pixels") of the image represented by the data stream are exposed on the photosensitive medium to form a latent image, which is then transferred to an appropriate image receiving medium such as sheet paper.

Data in each of the fast and slow scan directions is generally sampled. The sampling rate of the slow scan direction data equates to 300 lines per inch or more in many printing apparatus. It has been shown that errors in the slow scan direction of as small as 1% of the nominal line spacing may be perceived in a half tone or continuous tone image. This implies a need for a high degree of spot position control in the slow scan direction on the image plane, especially in such applications as multiple beam and multiple ROS color printers where control of the position of multiple spots is critical. Furthermore, high resolution printing, or the order of 600 spots per inch or higher demands very accurate spot positioning.

Errors in the spot position in the slow scan direction arise from many sources, including polygon and/or photosensitive medium motion flaws, facet and/or image plane (e.g., photosensitive medium) surface defects, etc. These errors are most commonly addressed by passive or active in-line optics. Positional errors which extend over an entire scan line are most commonly compensated for by retarding or advancing the start of scan by one or more scan lines (this correction being limited to errors of whole multiples of a scan line spacing). See, for example, *Advances in Laser and E-O Printing Technology*, Sprague et al., Laser Focus/Electro-Optics, pp. 101–109, October 1983. Another approach employing passive optics is the use of extremely high quality optical and mechanical elements. This necessarily implies higher overall costs, and possible limitations on the durability of the system. Still another example of passive optical correction is the system disclosed in U.S. Pat. No. 4,040,096, issued Aug. 2, 1977 to Starkweather which accommodates a basic polygon ROS structure having runout and/or facet errors (both scanning errors in the slow scan direction) by locating a first cylindrical lens in the pre-polygon optical path, which focuses the beam in the slow scan direction onto the facet, and a second cylindrical lens in the post-polygon path, which focuses the facet onto the desired image plane. Toroidal elements and concave mirrors have also been used to accomplish the same function.

Active compensation for process scan direction errors usually involves a closed loop and/or memory-fed compensation system. A closed loop acousto-optical (A-O) compensation system is discussed in *Laser Scanning for Electronic Printing*, Urbach et al., Proceedings of the IEEE, vol. 70, no. 6, June 1982, page 612, and the reference cited therein. As discussed in this reference, a slow scan spot position detector is placed in the scan line which, together with related processing apparatus, is capable of quantifying the slow scan displacement. An A-O element is disposed in the optical path whose refractive index may be varied by establishing therein an acoustic wave. A variation in the acoustic wave generated in the A-O element is accompanied by a variation in the dispersion angle (that is, the angle of the output beam relative to the angle of the input beam). The slow scan displacement information from the detector and processing apparatus is fed to the acoustic wave generating portion of the A-O device, which may then control the slow scan direction position of the scan line in response to the displacement information. Further, the control information for certain recurrent displacement errors may be measured in advance and synchronized with the angular motion of the rotating polygon, as discussed in the above reference. See also Bestenreiner et al., *Visibility and Correction of Periodic Interference Structures In Line-by-Line Recorded Images*, J. Appl. Phot. Eng., vol. 2, no. 2, pp. 86–92, Spring 1976.

One technology which, although it is directed to a method of scanning, as opposed to addressing slow scan direction errors, is nonethless relevant is disclosed in *Fast Dispersive Beam Deflectors and Modulators*, Filinski and Skettrup, IEEE Journal of Quantum Electronics, vol. QE-18, no. 7, pp. 1059–1062, July 1982. As briefly described therein, a static optical element having dispersion characteristics which vary as a function of the wavelength of the incident light can be utilized to scan in one dimension by varying the output wavelength of the light source. Various types of static dispersive elements are mentioned therein including prisms and gratings, although no details about incorporation of this type of scanning element into a complete scanning system are provided. Nor is there any mention in that reference about employing the described apparatus to control slow scan direction spot position.

There is presently a need in the art for spot position control apparatus and methods which provide improved continuous, very high resolution deflection of an optical beam in the slow scan direction.

Shortcomings of spot position control schemes known in the art include the complexity, cost and/or the difficulty of manufacture of such systems. For example, the use of high quality optics requires not only high quality optical elements, but utmost control in the positioning of those optics, in order to obtain the requisite very precise mechanical control sufficient to adjust spot position 0.02 mm or less, required in many cases. In order to achieve this level of spot position control with the aforementioned acousto-optic modulators, an acoustic wave must be established and maintained with great precision. The acousto-optic modulators employed are relatively quite expensive, and require an associated accurate high frequency signal generator an related electronics to produce and maintain the acoustic waves.

Two further disadvantages of many prior art spot position control schemes are the speed and precision at which they are capable of operating. For example, three of the most common ROS schemes, cylinder lenses, rotating mirrors, and translating roof mirrors are generally too slow to correct for motion quality errors or line-to-line errors, while rotating mirrors and translating roof mirrors are also large and therefore difficult to move precisely and quickly.

SUMMARY OF THE INVENTION

The present invention provides a novel method for controlling the spot position or registration in the slow scan direction in an optical output system which overcomes a number of problems and shortcomings of the prior art. Spot position refers to the location that a light beam is incident upon an image plane, and spot registration refers to the location that the light beam is incident on that image plane relative to other spot positions (for example in overwriting a spot for tone, position, color, or control of other parameters). However, for simplicity of explanation, any reference to control of spot position will include control of spot registration, unless otherwise noted. In general, the spot position control is provided by interposing in the image path a beam deflecting element which deflects the beam an amount which varies as a function of the wavelength of the light it deflects. A variable wavelength light source, such as a multiple wavelength solid state laser, may then be employed as the light source so as to allow controlling of the spot position. Spot position control may be achieved for either a single spot or for multiple spots where the position of each spot relative to the other spots is maintained. Depending on the output parameters of the optical output apparatus embodying the present invention, spot position control may be achieved on a pixel-by-pixel basis.

The present invention may be embodied in a ROS apparatus which includes, inter alia, a variable wavelength light source, typically a multiple wavelength solid state laser, for emitting a light beam at a selected wavelength, means for controlling the wavelength of output of the light source, optical beam deflecting means, such as a prism of glass or semiconductor material, for deflecting the light beam an amount that is determined by the wavelength of the light passing through it, means for modulating the light beam in accordance with a data signal, means for scanning the light beam in a raster fashion, and image plane means, such as a photoreceptive element, for receiving the scanned light beam. Means for determining the existence and extent of spot position errors and/or the need for application of predetermined spot position correction may also be included.

In operation, a light beam is generated by the light source which is modulated in response to an image data signal. The light beam is scanned across at least a portion of a surface of the image plane means in a fast scan direction, as well as scanned across at least a portion of a surface of the image plane means in a slow scan direction which is normal to the fast scan direction. The existence and extent of error, if any, in the position of the light beam in the slow scan direction is determined for a part or all of the fast scan direction. Correction for any slow scan direction error is performed by varying the output wavelength of of the light source in response to the determination of the existence and extent of such error. This change in wavelength results in a change in the extent which the light beam is deflected in the slow scan direction by the deflecting means, which ultimately changes the position that the beam strikes the image plane means.

The control of spot position on the image plane provided by the present invention may be employed to correct for inter-line slow scan direction positional errors by varying the output wavelength of the light source in response to the output of a means for detecting and quantifying such positional errors and/or in response to predetermined correction information output from a processor controlled memory unit or the like.

Furthermore, the maximum amount of slow scan direction spot position correction that will be required will be equal to one half of a scan line height. Any greater amount of correction may be realized through a combination of the above spot position control and retardation or advancement of one or more scan lines.

The scope of the present invention and the manner in which it addresses the problems associated with prior art methods and apparatus will become more readily apparent from the following detailed description when taken in conjunction with the accompanying drawings and claims.

BRIEF DESCRIPTION OF THE DRAWINGS

In general, like reference numerals will be used to denote like elements as between each of the aforementioned figures.

DETAILED DESCRIPTION

Figures 1, 1A, 2:
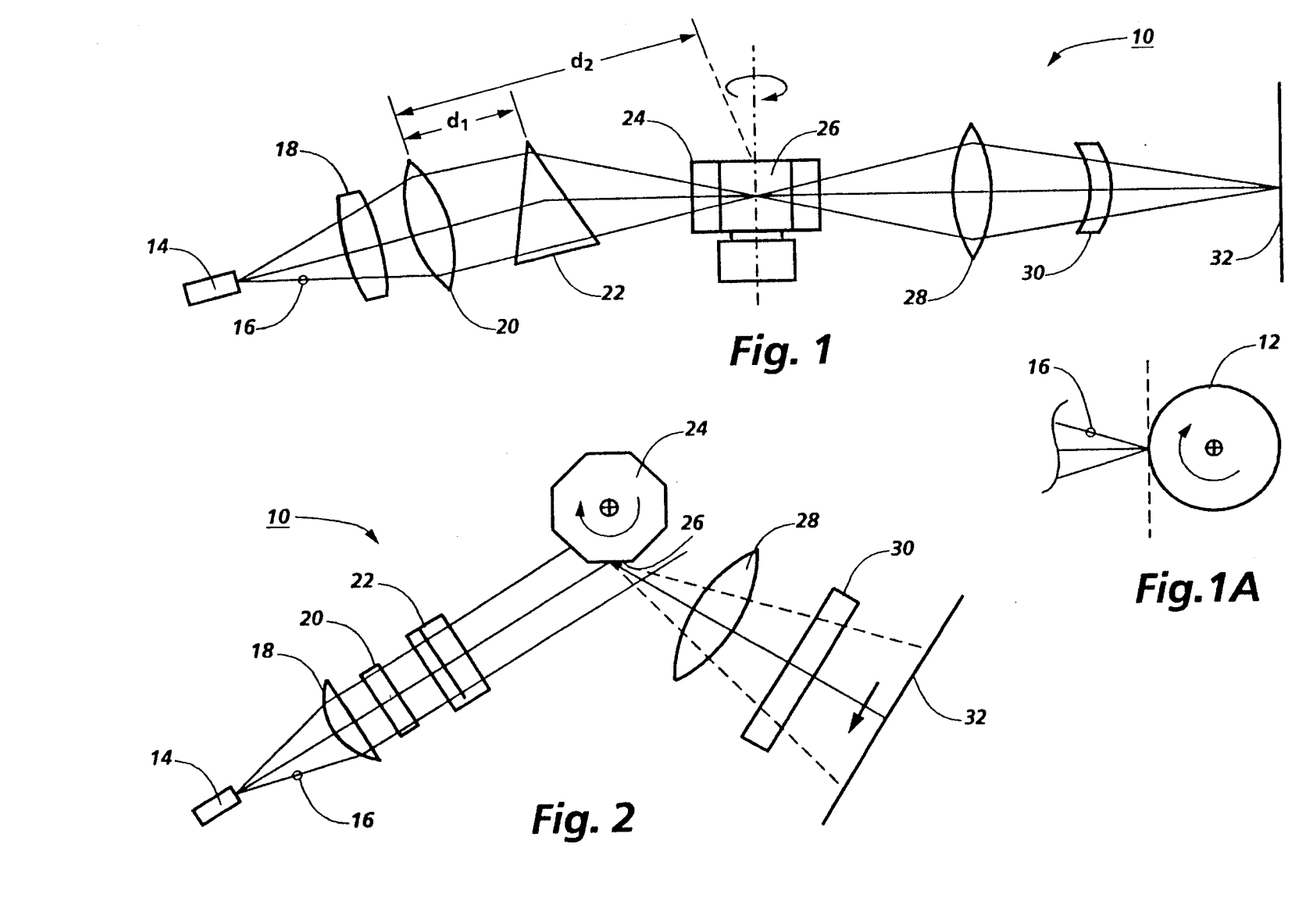
FIG. 1 shows a side or elevation view of the general optical configuration of an apparatus according to one embodiment of the present invention, showing an optical beam deflecting element in the form of a prism disposed between the light source and the rotating polygon scanning device of a typical ROS system.
FIG. 1A shows a photoreceptive drum at the image plane of the apparatus of FIG. 1 as might typically be employed in a xerographic printing application of the present invention.
FIG. 2 shows a top or plan view of the general optical configuration of the apparatus of FIG. 1, showing an optical beam deflecting element disposed between the light source and the rotating polygon scanning device of a typical ROS system.

A detailed description of a first embodiment of the present invention is presented herein with reference to FIGS. 1 and 2, which show, respectively, slow scan plane and fast scan plane views of a scanning apparatus 10. Apparatus 10 is a raster output scanning device of the type which may, for example, output a scanned modulated optical signal to a photoreceptive drum 12, such as that shown in FIG. 1A, for use in a xerographic printing process. Alternatively, apparatus 10 may output a scanned modulated optical signal to a display device, a photographic device or other application employing such a scanned modulated optical signal.

Apparatus 10 includes a light source 14, such as a solid state laser or array of lasers, which produces a diverging beam of coherent light 16. In the path of beam 16 are a spherical lens 18, a cylindrical lens 20, which has power only in the slow scan plane, optical beam deflecting element 22, which is described in further detail below, scanning device 24, which is shown as a rotating polygon having at least one reflective facet 26 (but which may also be a rotating hologram, rotating diffraction grating, etc.), first spherical lens 28, and toroidal lens 30. The path of beam 16 terminates at image plane 32, which may be a line on the aforementioned rotating photoreceptive drum 12 (FIG. 1A), a surface of a ground glass or other type of display screen, a photosensitive film, etc.

Spherical lens 18 serves to collimate the diverging beam 16. Cylindrical lens 20 serves to focus beam 16 in the slow scan plane onto facet 26 of scanning device 24. Since beam 16 is not focussed in the fast scan plane, it appears on facet 26 as a line which extends across the entire width of facet 26.

Prior to its incidence on facet 26, beam 16 passes through, and is deflected by optical beam deflecting element 22. The role of element 22 is to provide beam deflection by an angle which is determined by the wavelength of the incident light. The structure and details of optical beam deflecting element are discussed further below. Beam 16, having been appropriately deflected is then reflected by facet 26 so as to pass through spherical lens 28. Since the beam converges on facet 26, upon reflection it diverges. Therefore, lenses 28 and 30 are employed to refocus the beam to a circular or elliptical cross-section onto image plane 32, and to correct for scan nonlinearity (f-theta correction). Toroidal lens 30, or an equivalent thereto (such as a cylindrical mirror) further corrects for wobble (scanner motion or facet errors).

Thus, if polygon 24 rotates in a clockwise fashion, as shown in FIG. 2, a beam reflected from one of its moving facets will be caused to scan across the image plane 32, as indicated by the arrow. By modulating the beam, for example by modulating the current applied to the laser itself from below to above the lasing threshold, as known in the art, a scanned modulated single beam of general application results. If the image plane 32 comprises the line on the rotating photoreceptive drum 12 of FIG. 1A, and the rotation of drum 12 and the modulation and scanning of the beam are properly coordinated, a ROS printer device may be realized.

Figure 3:
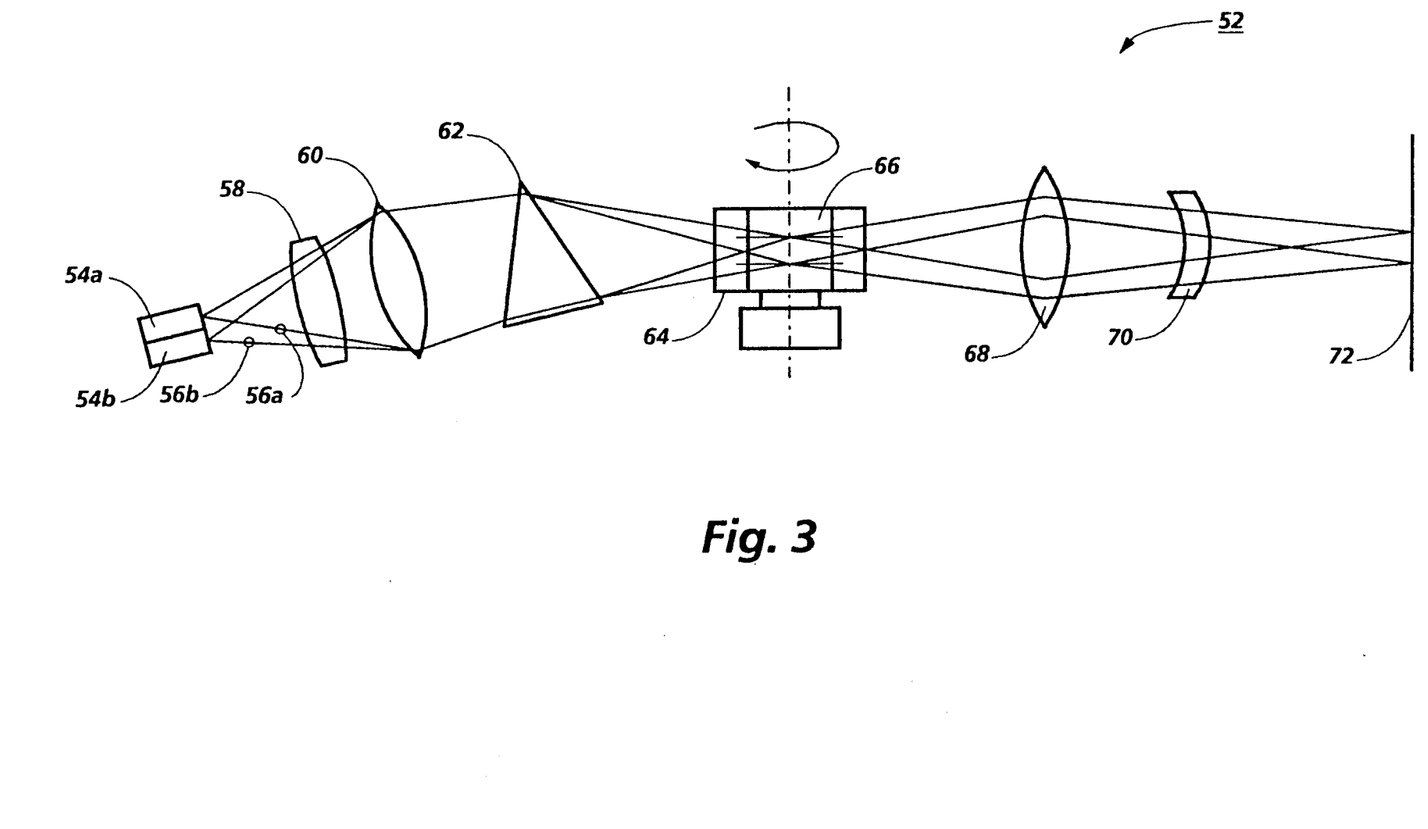
FIG. 3 shows a side or elevation view of the general optical configuration of another embodiment of the present invention, showing an optical beam deflecting element disposed between a multiple light source and the rotating polygon scanning device of a typical multiple beam ROS system.

An embodiment of the present invention allowing simultaneous and independent spot position or registration control for a plurality of spots is shown in FIG. 3. Apparatus 52 includes multiple light sources 54a, 54b, such as independent solid state lasers, or a monolithic multiple beam solid state laser, which produce diverging beams of coherent light. The wavelengths of the beams need not be the same, since their positions relative to one another are independently controlled in order to position each spot at the start of scan. As viewed in the slow scan plane of FIG. 3, beams 56a and 56b pass through spherical lens 58 which collimates the beams in the fast scan plane. The collimated beams then pass through a cylindrical lens 60, and an optical beam deflecting element 62 so that they illuminate a facet 66 of scanning device 64. Cylindrical lens 60, which has power only in the slow scan direction, focuses the beams 56a and 56b through element 62 onto facet 66, each beam being focused only in the slow scan direction so that each beam focuses on facet 66 as a line. Facet 66 reflects each of the beams, which at this point diverge, to lens 68. Lenses 68 and 70 refocus the beams onto image plane 72 and correct for scan nonlinearity. Lens 70 is a toroidal wobble correcting element. As before, the image plane may be ground glass, a viewing screen, a photosensitive material (film, electrostatic photoreceptor, etc.), or other image plane viewing or receiving medium. Modulation of the beams may be conveniently achieved by directly modulating the output of each light source, for example by modulating the current applied to the laser itself from below to above the lasing threshold, as known in the art.

Due to the similarity between the structure and operation of the embodiment of FIGS. 1 and 2 and the embodiment of FIG. 3, the following description of these embodiments shall be with regard to a single beam embodiment (that shown in FIGS. 1 and 2) for clarity and simplicity. The following description is, however, equally applicable to multiple beam apparatus, as will be appreciated by those skilled in the art. Furthermore, many of the details of the lenses and other optical and mechanical components of a complete ROS system may be omitted for clarity since they are well known in the art.

For the purposes of the following explanation, it will be assumed that optical beam deflecting element 22 takes the form of an isosceles triangular prism, as shown in FIGS. 1 and 2. Furthermore, the material from which optical beam deflecting element 22 is formed will be assumed to be optically transparent glass. However, it will be appreciated that optical beam deflecting element 22 may take other forms such as a diffraction grating, thin film or similar element where appropriate. It will be further understood that optical beam deflecting element 22 may be fabricated of glass, a semiconductor material such as AlGaAs, lithium niobate, a liquid crystal, etc., as discussed in further detail below. Also, it will be appreciated that optimal results are achieved when element 22, in the case that it takes the form of a prism, is fully illuminated (i.e., fully filled with light). This is because the resolving power of the prism is inversely proportional to the width of the optical beam, which sets a lower limit on the height of the prism. Hence, fully illuminating the prism achieves maximum resolution. Although beam 16 is focused on facet 26, and not on beam deflecting element 22, by lens 20, element 22 is effectively fully illuminated by locating element 22 much closer to lens 20 than facet 26. That is, $d_1$ is much smaller than $d_2$.

Figures 4, 4A:
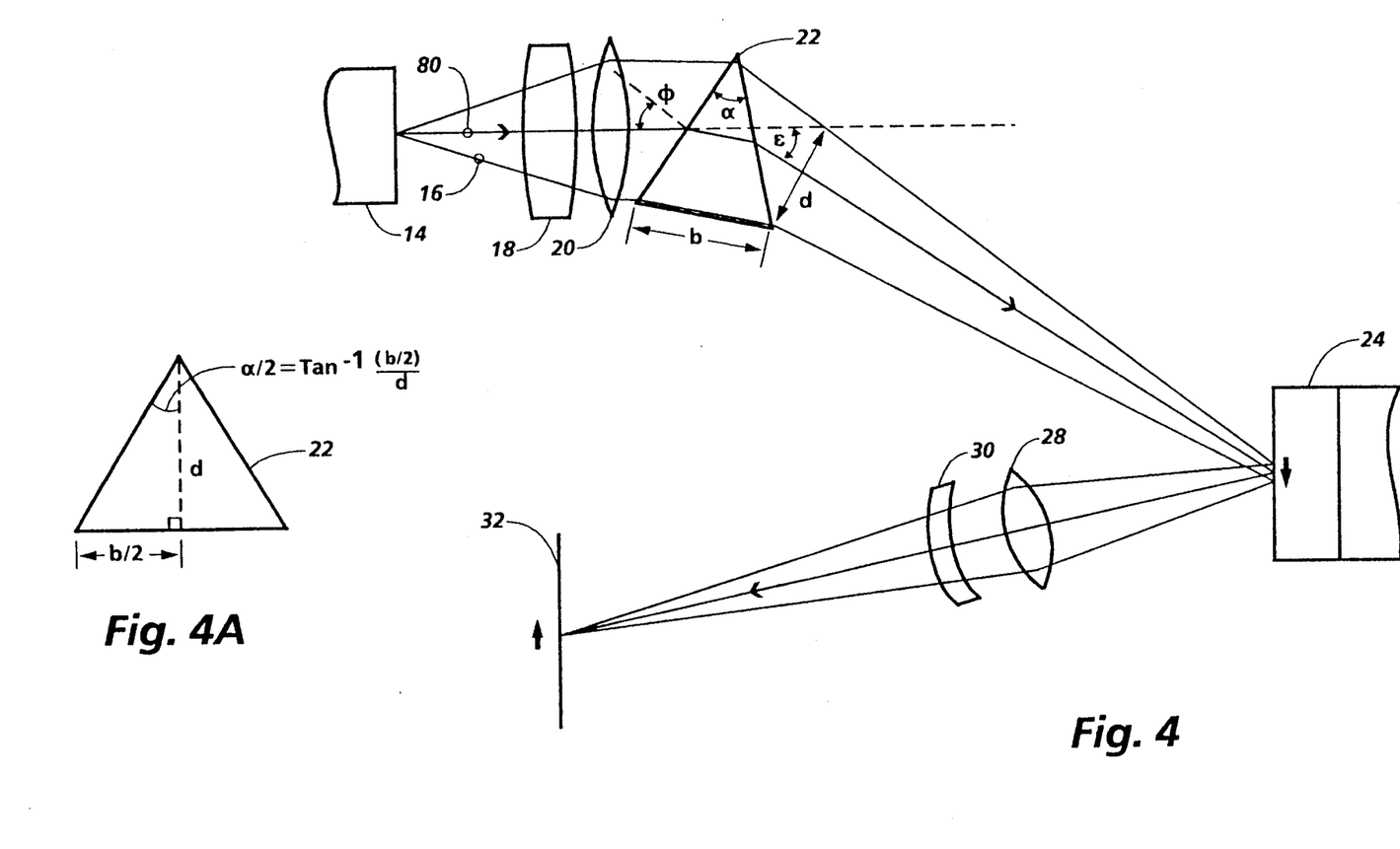
FIG. 4 shows a schematic representation of a ROS system for the purposes of describing the nature and extent of the control of spot position provided in the slow scan direction by the present invention.
FIG. 4a shows the dispersive element of one embodiment of the present invention labeled for calculation of the angle α of the element.

FIGS. 4 and 4a show a schematic representation of apparatus 10 for the purposes of describing the nature and extent of the control of spot position provided in the slow scan direction by the present invention. For the purposes of simplicity of explanation, only elements necessary to the explanation have been shown therein.

Facilitating the control of the registration of the spot is variable wavelength light source 14 and optical beam deflecting element 22. The basis of this control is the feature of element 22 that its refractive index differs for different wavelengths of the light passing through it (or similarly, when element 22 operates by reflection, the angle of reflection varies as a function of the wavelength of light).

Rays of optical beam 16, as illustrated by a representative ray 80, will undergo an angular deviation & upon refraction by element 22. The extent of that refraction will vary as a function of the wavelength of the light. M. Born and E. Wolf show in *Principles of Optics* (fifth ed., Pergamon Press, p. 407) that the resolving power (resolution limit) A of a prism is given by $$A = \lambda/\Delta\lambda = b(dn/d\lambda) \qquad (1)$$

where b is the base of the prism, $\lambda$ is the wavelength of incident light, and n is the index of refraction. From I. Filinski and T. Skettrup, *Fast Dispersive Beam Deflectors and Modulators*, IEEE Journal of Quantum Electronics, vol. QE-18, no. 7, July 1982), the number of resolvable points N per unit wavelength is $$dN/d\lambda = A/\lambda \qquad (2)$$

Combining the above equations (1) and (2) yields $$dN/d\lambda = b(dn/d\lambda)/\lambda \qquad (3)$$

and solving for b in terms of $\lambda$ we get $$b = \lambda(dN/d\lambda)/(dn/d\lambda) \qquad (4)$$

For the system shown in FIG. 4, the largest required displacement of the image of the spot would be $\pm 0.5$ line or spot widths (any greater correction may be accomplished by advancing or retarding the slow scan motion by one or more scan lines in combination, if necessary, with displacement provided by the present invention). Thus, the desired number of resolvable spots is two. Assume, for the moment, that wavelengths of 770 nm and 790 nm are chosen as the low and high operating wavelengths of the light source. Then, $dN/d\lambda = 2/20 = 0.1$ nm$^{-1}$. Since the wavelength difference of $\pm 10$ nm is very small compared to the operating wavelengths, 780 nm, which is midway between the low and high wavelengths, is chosen for the purposes of calculating an example of prism size. Assume also that Schott SF 10 is chosen as the prism glass. For SF 10 $dn/d\lambda = 9.5 \times 10^{-5}$/nm. Thus, $$b = 780(0.1)/(9.5 \times 10^{-5}) = 8.2 \times 10^5 \text{nm} = 0.82\text{mm}$$

This is quite reasonable for a system such as that shown in FIG. 4.

Furthermore, for the system shown in FIG. 4, the diameter of the beam can be found from $$d = 2w_{ff} = 2z\lambda/\pi w_0 \qquad (5)$$

where $w_{ff}$ is the $1/e^2$ spot radius in the far field, $w_0$ is the beam waist, which will be assumed to be 0.002 mm for the purposes of the present explanation, and z is the distance from the waist, which will be assumed to be 4.02 mm for a 20× lens shown. Therefore, $w_{ff} = 4.02(780 \times 10^{-6})/\pi(0.002) = 0.5$ mm, so that $d = 2w_{ff} = 2(0.5 \text{ mm}) = 1$ mm. Taking into account refraction at the prism's input, the prism angle $\alpha$ may be determined $$\sin^2(\alpha/2) = b^2/(4d^2 + n^2 b^2) \quad (6)$$

from which a prism angle $\alpha$ may be found as $\alpha = 40.9$ degrees.

An alternative to the glass prism discussed above is a semiconductor prism of a material such as AlGaAs. Two particular embodiments employing an AlGaAs optical beam deflecting element are considered. The first is a simple substitution of AlGaAs for glass. At present there are practical limitations to such an embodiment based on the cost, internal imperfections, etc. of mm thick platelets of this material. To the extent that a homogeneous semiconductor prism is practicable, its operation and design will differ little from the prism described above of glass except that its dispersive power, i.e. $dn/d\lambda$, is more than 20 times greater than glass. Hence the base of the prism and/or the wavelength shift of the laser source can be less than required with a glass prism, as illustrated below. However, one alternative to mm thick platelets of semiconducting material is the epitaxial formation of a prism of semiconducting material.

Figure 5:
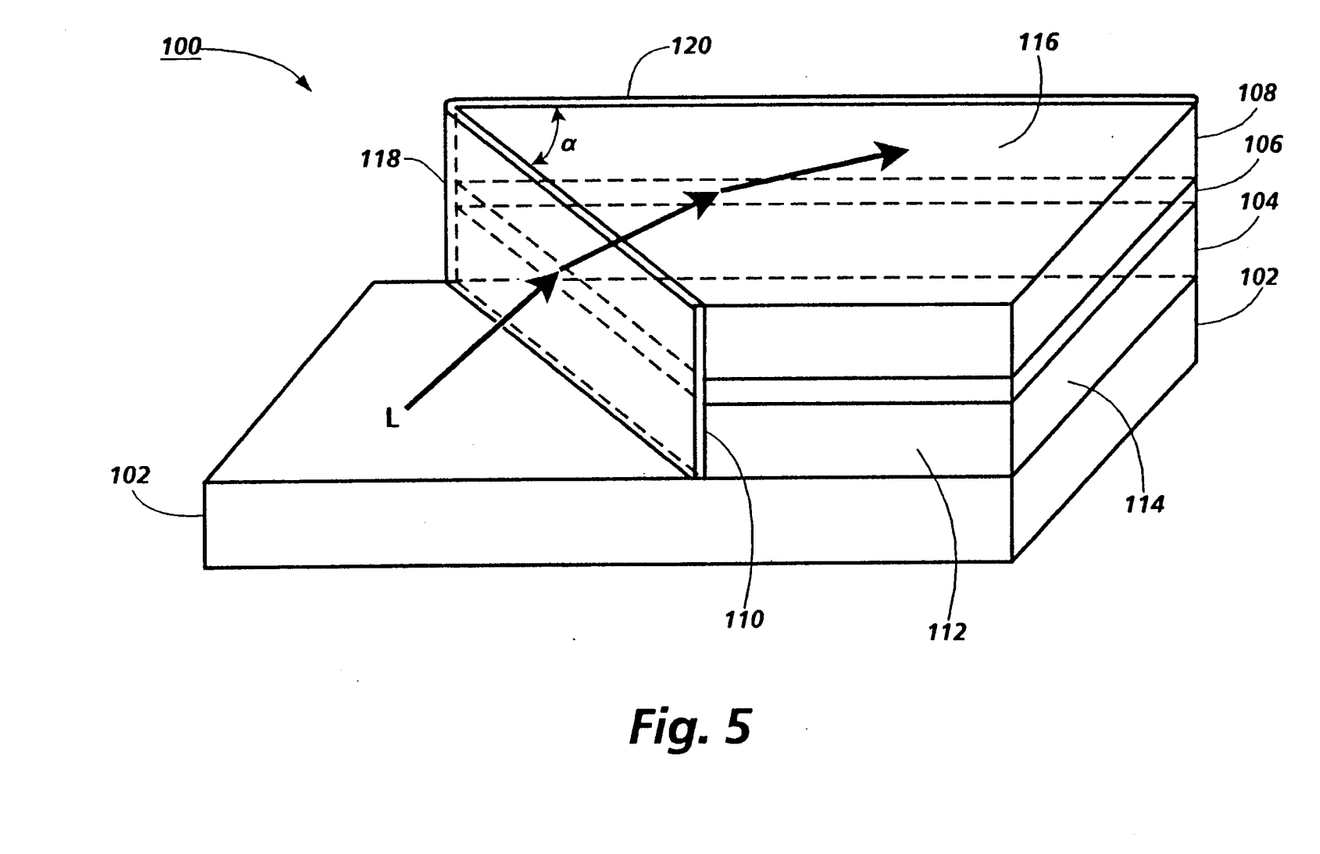
FIG. 5 shows in detail an optical beam deflecting element which may be employed in the present invention to allow controllable spot registration in a ROS system.

The second particular embodiment is such an epitaxially grown semiconductor prism having a thin waveguide core as the optical element. Referring now to FIG. 5, the optical beam deflecting element 100 of this embodiment includes a substrate 102 having deposited thereon an n-$Al_yGa_{(1-y)}As$ cladding layer 104, where y might typically be equal to 0.40, for example by MOCVD methods well known in the art. A waveguide core 106 of $Al_xGa_{(1-x)}As$, where $y > x$ might be 0.2, is next deposited on layer 104 (although the waveguide core might also be a single or multiple quantum well structure, where appropriate). Waveguide core 106 is chosen to have a wide bandgap so that it is transparent at the wavelengths of operation. A p-$Al_zGa_{(1-z)}As$ cladding layer 108, where z is typically equal to y, although it need not necessarily be so, is then deposited on core 106. The structure is then etched down to substrate 102 by methods known in the art to form etched facet 110. Then, three sides of the structure are cleaved to form cleaved facets 112, 114, and 116. Anti-reflective (AR) coatings 118 and 120 are next applied to facets 110 and 116, respectively. A prism is thereby formed which serves to selectively refract light incident thereupon as a function of the light's wavelength. The path of the diffracted light is shown by way of the exemplary double arrow in FIG. 3 labeled L.

For a waveguide core of $Al_{0.2}Ga_{0.8}As$, $dn/d\lambda$ at 780 nm is calculated to be $2.24 \times 10^{-3}$ nm$^{-1}$ from Casey et al., *Refractive Index of $Al_xGa_{1-x}As$*, Applied Physics Letters, vol. 24, no. 2, p. 63 (1974). To facilitate design of a laser source which may be employed in the present embodiment, a wavelength separation of 1 nm for the two resolvable points will be assumed. This gives $dN/d\lambda = 2$ nm$^{-1}$. From equation (4) above, the prism base b can be found as $b = 780 \times 2/2.24 \times 10^{-3} = 0.696$ mm. From equation (6), with $n = 3.58$ for $Al_{0.2}Ga_{0.8}As$, a 1 mm beam diameter, and $b = 0.696$ mm, the prism angle $\alpha$ is found to be $\alpha = 25.1$ degrees. To illustrate the possibility of tradeoffs between wavelength separation and prism size, consider an alternative design. A wavelength separation of 4 nm for the two resolvable points may be employed in the present embodiment. This gives $dN/d\lambda = 0.5$ nm$^{-1}$. The prism base b can be found as $b = 780 \times 0.5/2.24 \times 10^{-3} = 0.174$ mm and the prism angle $\alpha$ is found to be 9.5 degrees for $Al_{0.2}Ga_{0.8}As$ and a 1 mm beam diameter. The selection of other combinations for the wavelength separation and prism base is also possible as will be appreciated by one skilled in the art.

Since the wavelength change required for a given number of resolved spots depends only on n and b, we fix b and tradeoff beam width for prism angle. Table 1 indicates possible values for an $Al_{0.2}Ga_{0.8}As$ waveguide core, with $n = 3.58$, and prism base $b = 0.696$ mm.

TABLE 1

| Beam width d (mm) | prism angle $\alpha$ (degrees) | angle of incidence $\phi$ (degrees) | prism height (mm) |
|---|---|---|---|
| 0 | 32.4 | 87.2 | 1.19 |
| 0.5 | 30.0 | 67.9 | 1.30 |
| 1.0 | 25.2 | 51.3 | 1.56 |
| 2.0 | 17.0 | 31.9 | 2.33 |
| 3.0 | 12.3 | 22.6 | 3.23 |
| 4.0 | 9.53 | 17.3 | 4.17 |

Figure 6:
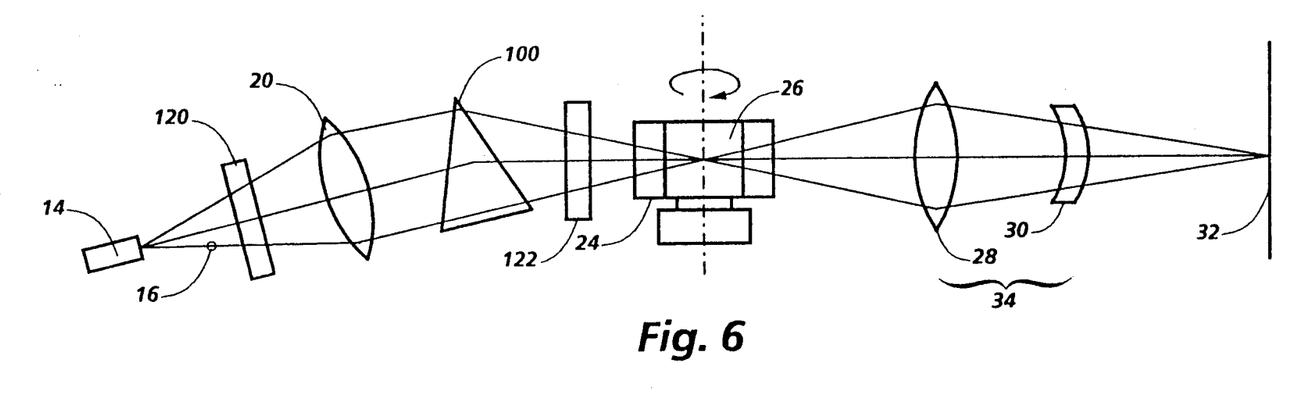
FIG. 6 shows a side or elevation view of the general optical configuration of another embodiment of the present invention, showing an optical beam deflecting element in the form of a semiconductor prism having a thin optical waveguide disposed between the light source and the rotating polygon scanning device of a typical ROS system.
Figure 7:
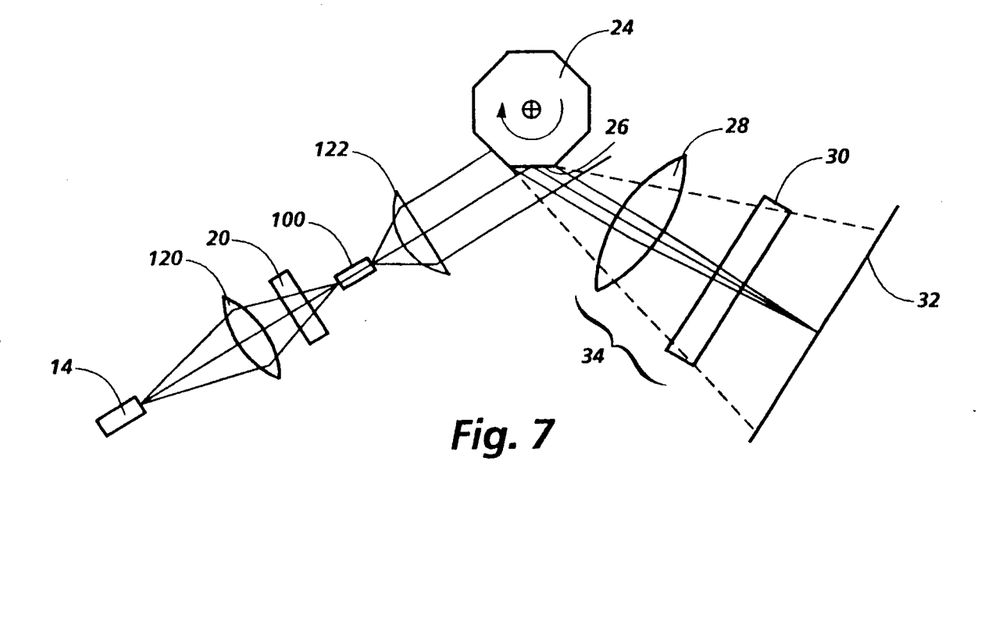
FIG. 7 shows a top or plan view of the general optical configuration of the apparatus of FIG. 6, showing an optical beam deflecting element disposed between the light source and the rotating polygon scanning device of a typical ROS system.

Waveguide core 106 is of the type that allows propagation of a lightwave therethrough while confining it in at least one dimension to the order of one wavelength. The lightwave propagates, without diverging, in the longitudinal direction of the guide since it is confined to the waveguide core by the lower refractive index of the cladding layers. However, in order to take advantage of such an arrangement, beam 16 must be focused onto the input facet of the prism. An embodiment of a scanning apparatus configured for application of the semiconducting optical beam deflecting element 100 is shown in FIG. 6. This embodiment is substantially as described above, with the exception that beam 16 is focused in the fast scan plane by cylindrical lens 120, which replaces cylindrical lens 18 of FIGS. 1 and 2. Furthermore, since element 100 behaves as a one dimensional optical waveguide, the light focussed on its entrance aperture propagates through it, and diverges as it leaves its exit aperture. Therefore, cylindrical lens 122 is employed to collimate the light in the fast scan plane prior to its arrival at facet 26.

Figure 8:
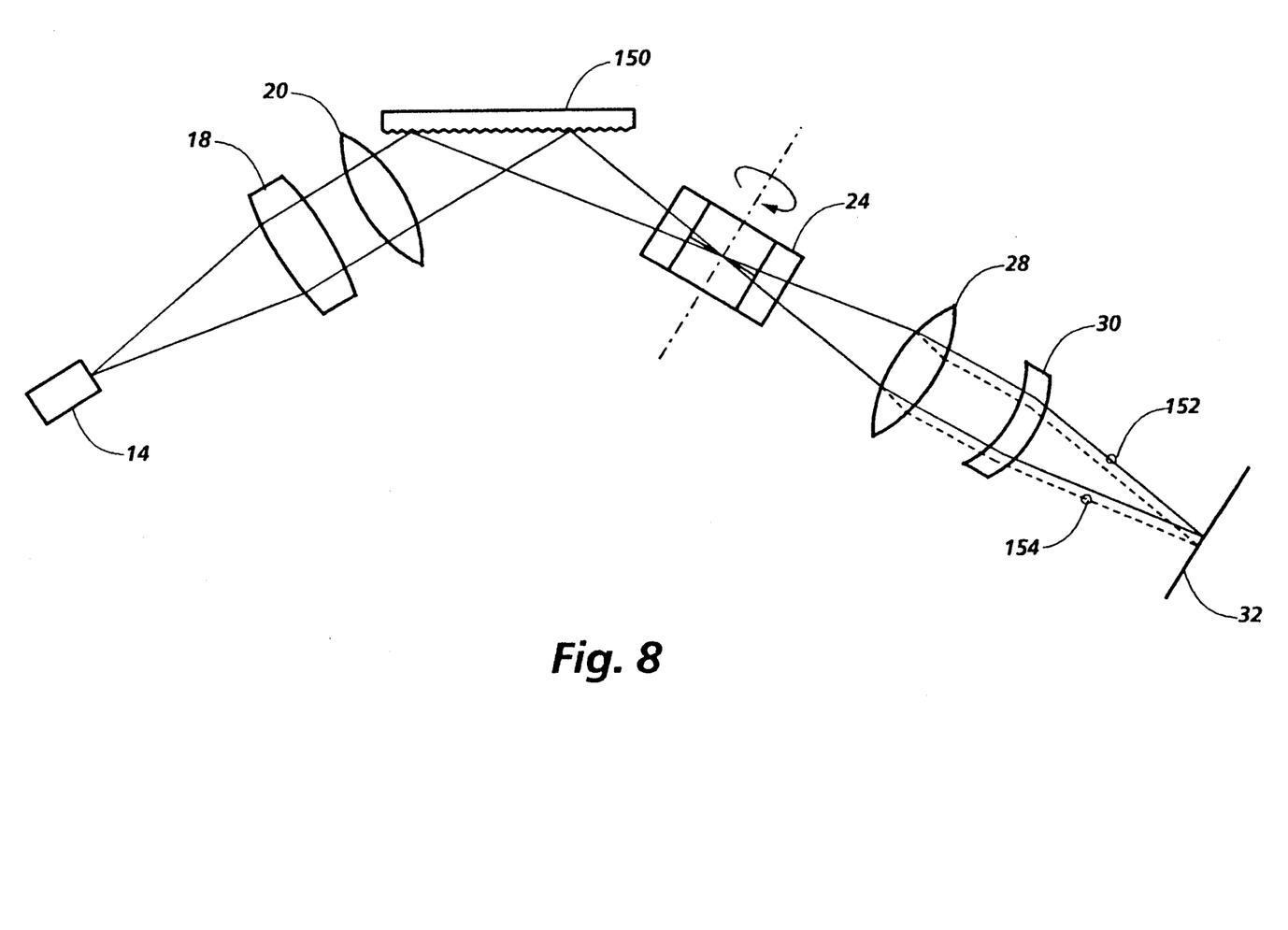
FIG. 8 shows a side or elevation view of the general optical configuration of another embodiment of the present invention, showing an optical beam deflecting element in the form of a diffraction grating disposed between the light source and the rotating polygon scanning device.

Yet another alternative to using the aforementioned prism is the use of a diffraction grating. Control of spot position may be achieved for smaller wavelength shifts when using a diffraction grating due to the grating's greater dispersive power. An example of such an embodiment is shown in FIG. 8, where diffraction grating 150 is of the type which diffracts light at an angle which is dependent on the wavelength of the light (diffracted beam 152 and diffracted beam 154 strike image plane 32 at different locations, which depend upon the wavelength of each beam).

The basis for spot control according to this invention is wavelength control of the light emitted by light source 14. A suitable light source for achieving spot position control is a laser source, such as a solid state, or diode laser. The output wavelength of a diode laser can be tuned over a range suitable for use with a glass prism, e.g., from 770 nm, by controlling the loss in the laser cavity. One method for accomplishing this may be to employ a split contact laser 200 of FIG. 9, having a small but separately contacted modulator region along the axis of the laser. Such a laser 200 includes an amplifier region 202 and a modulator region 204 optically interconnected by a low-loss waveguide region 206 which together form an optical cavity. A simple method of electrically isolating amplifier region 202 and modulator region 204 is the low-loss waveguide region 206, although electrical isolation may also be achieved by appropriate diffusions and/or proton bombardment as known in the art. Bounding the optical cavity of laser 200 are facets 208 and 210, such that light from the laser emits primarily from one or the other facet. Laser 200 will be assumed to be an individual laser for the present illustration, but may be one element of a laser array, the array embodiment being described elsewhere herein.

Figure 9:
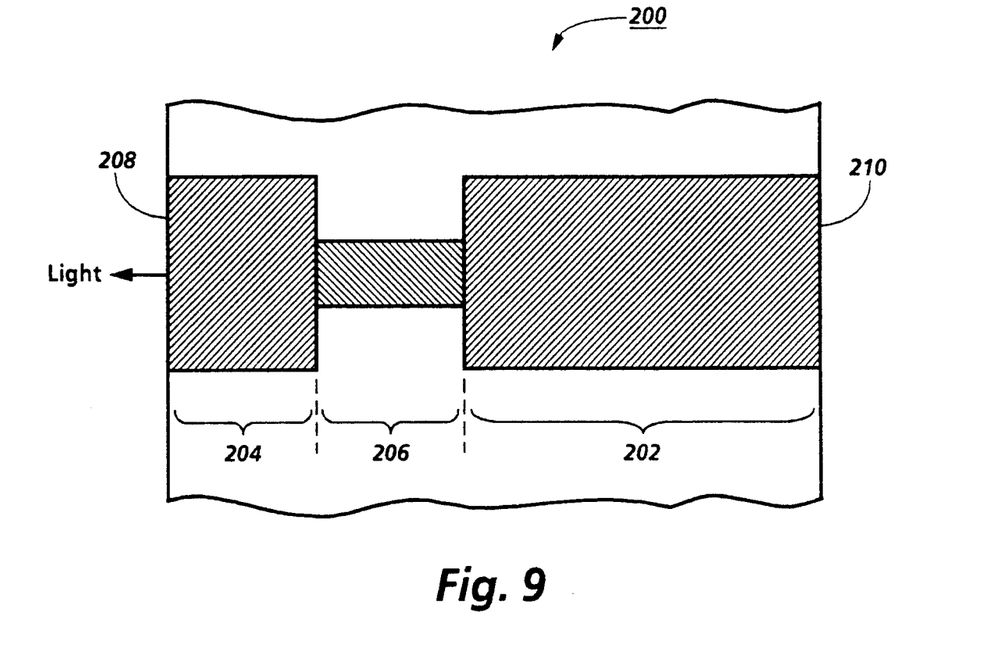
FIG. 9 shows one embodiment of a solid state laser capable of emitting at one of a number of selectable wavelengths.

Variation of the bias level on modulator region 204 controls the amount of loss present in the laser cavity from a maximum value $L_{max}$ to a minimum value $L_{min}$. Maximum loss is obtained with modulator region 204 unbiased (or reverse biased) and results from the intrinsic absorption of the unpumped active layer (not shown). Minimum loss is obtained with modulator region 204 forward biased, although the loss may also be negative, i.e., the modulator region 204 providing gain. With the modulator region 204 set for minimum loss, laser 200 is designed to emit at the longest wavelength required. As the modulator current is decreased, loss in the modulator region 204 is increased and the wavelength shortens. The length of modulator region 204 is determined by the amount of wavelength shift required. Tuning is discontinuous as the wavelength hops from one longitudinal mode to the next. In addition, the threshold of laser 200 is increased so that current to amplifier region 202 is increased in order to maintain constant power output at the lasing wavelengths. Thus, wavelength switching at constant power is accomplished by simultaneously switching drive currents to both the amplifier region 202 and the modulator region 204. If the wavelength shift required by the system is small (∼1 nm), the shortest wavelength may be obtained with modulator region 204 forward biased. A large wavelength shift (∼20 nm) may require near zero current or a reverse bias applied to modulator region 204.

Figure 10:
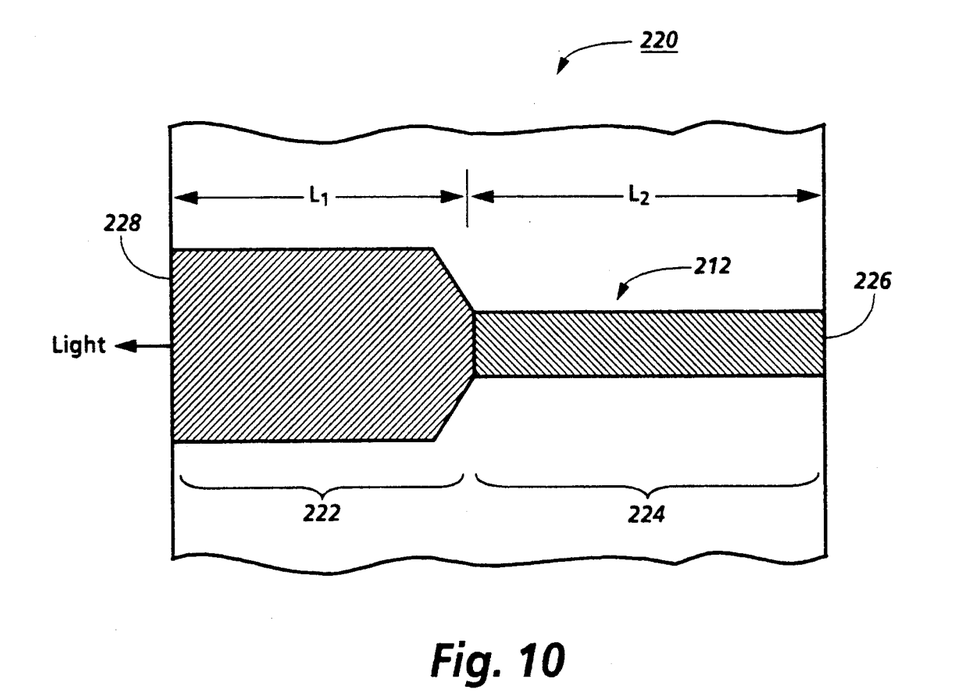
FIG. 10 shows another embodiment of a solid state laser capable of emitting at one of a number of selectable wavelengths.

The output wavelength of a diode laser can also be tuned over a range suitable for use with a semiconductor prism, e.g., from 780 nm to 781 nm, by controlling the index of refraction in the laser cavity. This approach inherently produces a smaller tuning range than the loss modulator described above, but is advantageous in that tuning is continuous (as opposed to step-wise) and variations in the power output between the different wavelengths are reduced. A laser 220 capable of achieving index control is shown in FIG. 10, and includes an amplifier region 222 and a separately contacted high bandgap modulator region 224 along the axis of the laser between rear facet 226 and light emitting facet 228 (although emission may be at either one of the two facets 226 or 228). In index modulator region 224, the optical waveguide has a bandgap greater than the bandgap of the amplifier region 222, and so does not absorb the lasing emission. Such a low-loss region can be produced by layer disordering techniques or by laser patterned desorption as known in the art (for example, see U.S. Pat. Ser. No. 4,962,057, dated Oct. 9, 1990, to Epler et al.) The index of refraction of the optical waveguide under forward bias is a function of the injected carrier density pursuant to the free carrier injection effect. For a detailed discussion of the free carrier injection effect see copending U.S. patent application Ser. No. 07/747,039. For an integrated device of this kind, we find that the index change $\Delta n$ required to shift the wavelength is given by $$\Delta n = [n_{g1}L_1L_2 + n_{g2}]\Delta\lambda/\lambda \quad (7)$$

where $L_1$ and $L_2$ are the lengths of the amplifier and modulator regions, respectively, and $n_{gi} = n_i - \lambda dn_i/d\lambda$ is known as the group refractive index in the amplifier region (i=1) or the modulator region (i=2) and $\lambda$ is the mean wavelength of operation. For AlGaAs, laser measurements give $n_{g1} = 4.24$ at 780 nm. From the experimental data of Casey et al., Applied Physics Letters vol. 24, no. 63 (1974), we calculate $n_{g2} = 1.83$ for $Al_{0.2}Ga_{0.8}As$ at 780 nm. For $\Delta\lambda = 1$ nm, $L_1 = 250$ μm and $L_2 = 1000$ μm, $$\Delta n_2 = [4.24 \times (250/1000) + 1.83] \times [1.28 \times 10^{-3}] = 3.7 \times 10^{-3}$$

From Casey and Parish, *Heterostructure Lasers Part A: Fundamental Principles*, p. 31 (Academic Press 1978), the index change at 780 nm from the free carrier plasma is $\Delta n = -1.123 \times 10^{-21}/cm^3 \times \Delta N$, where $\Delta N$ is the change in carrier density. Thus, a carrier density change of $|\Delta N| = 3.29 \times 10^{18}/cm^3$ will produce a $\Delta n_2$ sufficient to shift the wavelength by 1 nm. Since the index change is negative, the wavelength is shortened. (In actuality, the operating wavelength is also shortened as a result of the increased threshold current produced by the small amount of optical absorption introduced by the injected carriers. Since both effects shorten the operating wavelength, a lower carrier density than calculated above will actually be required.)

If a wavelength shift much less than 1 nm may be employed, the modulator region 224 of FIG. 10 may be reversed biased in order to vary the refractive index via the electro-optic effect. This approach is advantageous in that the power output of laser 220 will remain nearly constant between wavelengths without need to adjust the current to the amplifier region 222. See the aforementioned copending patent application Ser. No. 07/747,039 for a more detailed discussion of the electro-optic effect.

Figure 11:
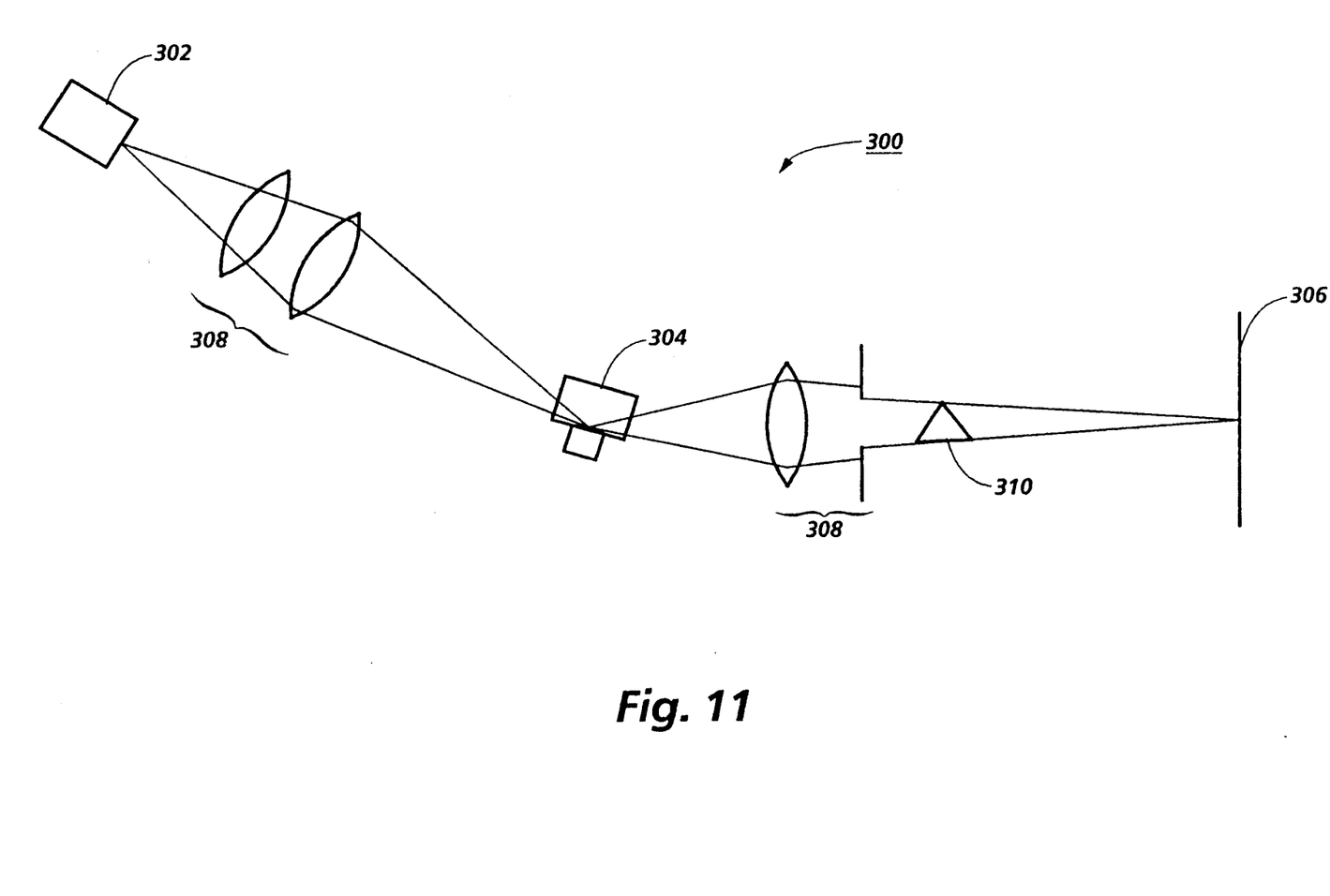
FIG. 11 shows a side or elevation view of the general optical configuration of another embodiment of the present invention, showing an optical beam deflecting element in the form of a prism disposed between the light source and a non-scanning modulation device.

In the above discussion it has been assumed that the scanning device (e.g., 24 of FIG. 1) is a rotating polygon having at least one reflective facet (e.g., 26 of FIG. 1). However, certain embodiments of the present invention obviate the need for a scanning device. For example, in the embodiment 300 shown in FIG. 11, rather than scanning a beam across the image plane, a linewidth beam from source 302 is pixel-by-pixel modulated by a TIR modulator 304 and projected to an image plane 306 by appropriate optics 308. The basic configuration of this embodiment is similar to that shown and described in U.S. Pat. No. 4,638,334 to Burnham et al., dated Jan. 20, 1987, so that details of the workings of the modulator and related elements are beyond the scope of this disclosure. However, in addition to the modulator and related elements, the embodiment of FIG. 11 includes the appropriate apparatus 310, such as a glass prism similar to that described above, to facilitate line position control in the slow scan direction on the image plane.

Described above are embodiments employing two distinct methods of modulation—direct modulation of the light source and modulation by way of total internal reflection and a zero stop. Other modulation schemes may, however, be employed without departing from the spirit and scope of the present invention. For example, another method of modulating beam 16 would be to project it either onto or through a modulator device (not shown), such as an electro-optic or acousto-optic modulator, etc. Placement of the modulator device along the beam path will depend upon its type, the configuration of apparatus 10, etc., as will be appreciated by one skilled in the art.

Figure 12:
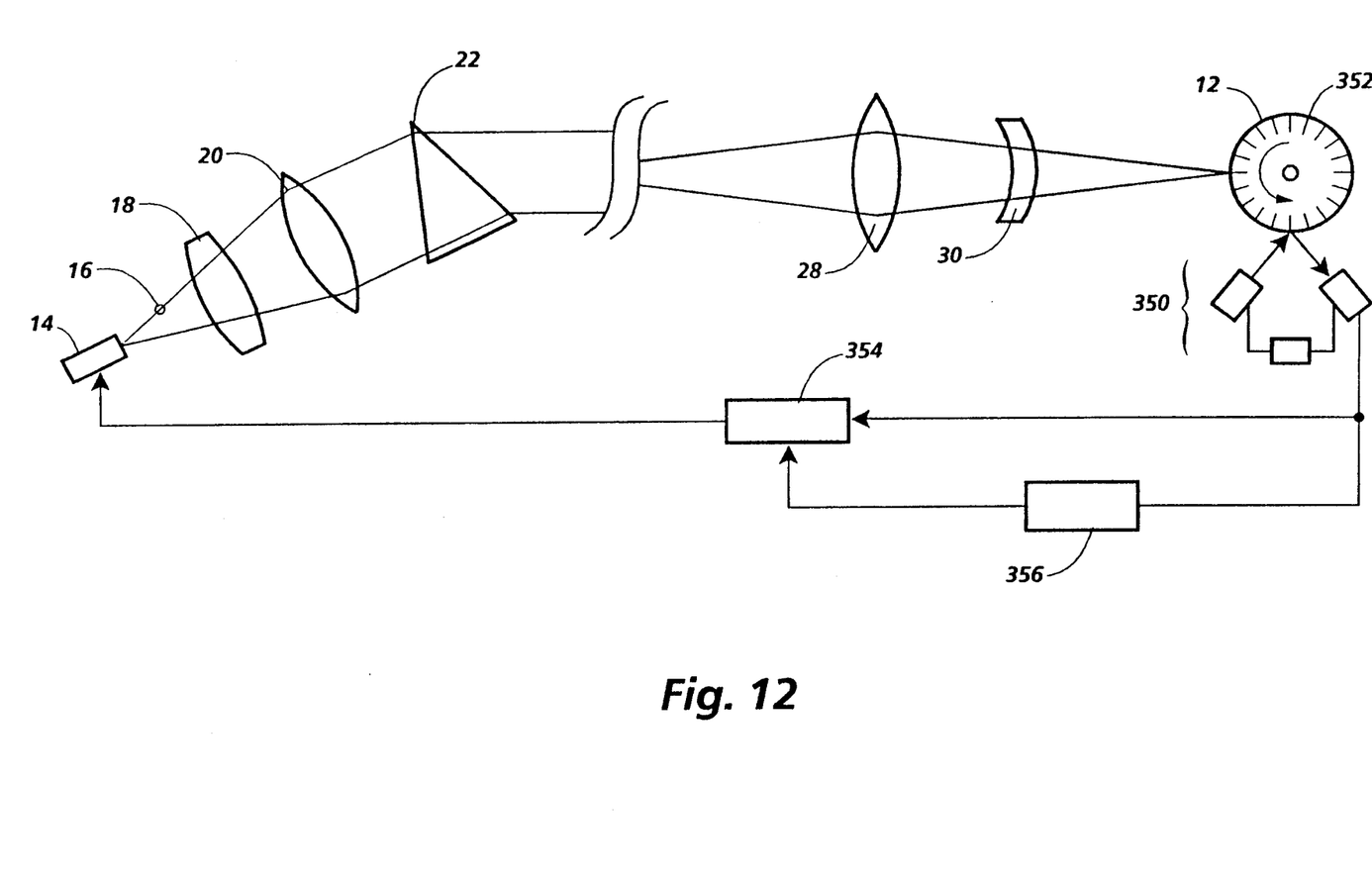
FIG. 12 shows a side or elevation view of the general optical configuration of an apparatus according to the first embodiment of the present invention, further including means for detecting errors in the position of the photoreceptive drum and for feeding a measure of the error back to the laser light source as a control signal for adjusting the position of the laser beam emerging from the optical beam deflecting element.

The method of the present invention may utilize either feedback control or control from stored data, or both, to move the spot in the process scan direction to accommodate for motion quality errors, and the like. In the case of feedback control, method and apparatus known in the art would be employed to determine the actual spot position, the desired spot position, and any difference therebetween, and to generate from a knowledge of that difference the proper control signals for effecting the wavelength adjustment resulting in the desired spot positioning. For example, the arrangement of FIG. 12 shows a simple method for determining the rotational error of a photoreceptive drum 12 by way of a synchronized strobe and sensor arrangement 350 utilizing timing marks 352 on drum 12. Arrangement 350 includes processing which enables determination of the existence and extent of rotational error, and generation of a control signal in response to the determination of the extent of error which is transmitted to control apparatus and/or current source 354 controlling the bias applied to the modulator and/or amplifier regions of light source 14.

In the case of control from stored data, the spot position correction is predetermined. This method is feasible for certain recurrent errors such as off axis rotation of a photoreceptive drum, surface distortion of a display screen, etc. The predetermined correction is applied to the apparatus controlling the bias applied to the light source from a processor controlled memory device 356 or the like. The output of the processor controlled memory device 356 would be synchronized by a strobe and sensor apparatus 350, or other suitable synchronization arrangement, and may or may not be used in conjunction with a real-time error determining package such as that described in the preceding paragraph.

Figure 13:
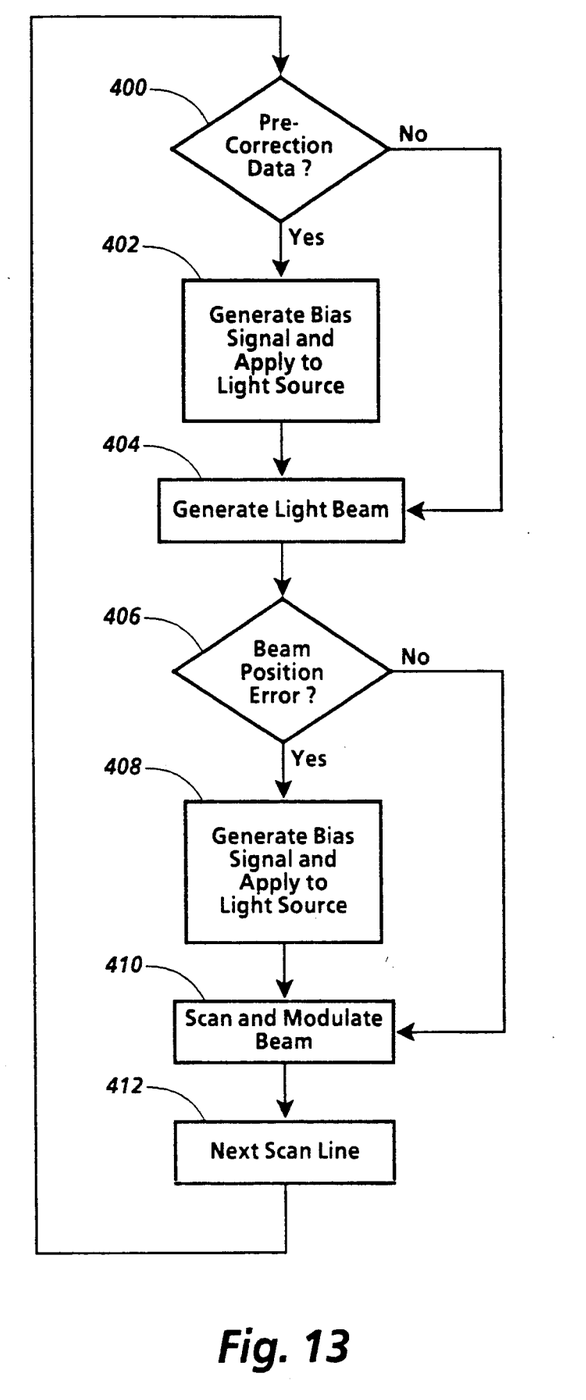
FIG. 13 is a flow diagram of one embodiment of the present invention for determining and correcting for slow scan direction errors on the fly, and for compensating for predetermined slow scan direction spot position errors.

FIG. 13 details one complete cycle of operation of the method of the present invention for correcting for slow scan direction errors. It will be assumed that any predetermination of required correction for recurrent errors has been made, and that the correction data has been stored in an appropriate memory device (not shown). To begin, means (not shown) are employed to determine whether the current scan line is one for which predetermined correction data has been stored. This is shown at step 400. If such data exists, the data is converted into a bias signal which is applied to the modulator region of the laser or other means for controlling the laser's output wavelength in order to correct for predetermined spot position error, as shown at 402. Once the correction for predetermined errors has been made, or if no such predetermined error data exists, the light beam is generated at 404. Next, the position that the beam is incident on the image plane is determined at 406 (alternatively, error in photoreceptor motion or position correctable by selective spot positioning is determined). If there is slow scan direction position error at this point, the extent of that error is determined by appropriate determining apparatus, for example by the aforementioned strobe and sensor arrangement. The extent of that error is converted to an appropriate electrical bias signal which is communicated to the modulator region of the laser or other means for controlling the laser's output wavelength at 408 in order to correct for the determined error "on the fly". Once the correction for this error has been made, or if it is determined that no such error exists, the beam may then be scanned and modulated in order to write the scan line at 410. When the end of scan is detected, a call is made for the next scan line data at 412, the scan processes in the slow scan direction and the process begins again at 400.

It will be apparent that, depending on the operating parameters of the optical output apparatus embodying the present invention, spot position control may be achieved on a pixel-by-pixel basis. For example, consider a relatively high performance laser xerographic printing apparatus with typical operating parameters of 60 page perminute output, $600 \times 600$ spot per inch resolution, and 14 inch scan. For this device, a typical pixel exposure time is on the order of 14 nanoseconds. Proper selection of materials and geometry for the electro-optic element of the present invention will allows switching speeds of 14 nanoseconds or faster, thus facilitating mid-line, pixel-by-pixel spot position correction.

By incorporating the above described spot position control methodology with the appropriate apparatus for xerographic printing, including, for example, a photoreceptor belt or drum, means for moving the photoreceptor, means for charging the photoreceptor, means for forming a latent image on the photoreceptor, means for transferring the latent image to paper, means for erasing the latent image from the photoreceptor and for cleaning the photoreceptor, paper transport means, and means for fusing the image onto the paper, a complete xerographic print engine may be produced. Details of the structure and operation of printer devices in general are beyond the scope of the present disclosure, however they are well known to those skilled in the art. It will be appreciated from the above description, though, that the present invention is particularly well suited for inclusion in those printing applications employing ROS as a portion of the printing process, as well as other printing applications.

In general, to those skilled in the art to which this invention relates, many changes in construction and widely differing embodiments and applications of the present invention will suggest themselves without departing from its spirit and scope. For example, the present invention operates equally well, and without significant modification, to control spot position in a single beam ROS or, en bloc, spot positions in a multiple beam ROS. Furthermore, it is possible to fold the optics of a ROS apparatus incorporating the present invention, and thereby compact the apparatus, by employing a reflective or transmissive/reflective body, as opposed to the aforementioned purely transmissive body, as the dispersive element. Further still, the apparatus and method of the present invention may be combined with other apparatus and/or methods of controlling spot position to achieve advantageous results. For example, the inventions of copending applications Ser. No. 07/747,039 and 07/747,176 may be employed herewith such that all spots emitted from a multiple laser array are selectively positioned by those inventions to correct for motion quality errors, while bow correction may be accomplished on individual spots by the present invention. In fact, the present disclosure has detailed several methods of shifting the wavelength of the light source in order to control spot position, but it will be appreciated that other methods and apparatus for wavelength control may be employed without departing from the spirit and scope of the present invention. Thus, the disclosures and descriptions herein are illustrative, and are not intended to be in any sense limiting.

What is claimed is:

1. A method of controlling the slow scan direction position at which at least one beam of light is focussed to a spot upon an image plane in an optical output system, comprising the steps of:

generating at least one beam of light;

deflecting the at least one beam of light by way of an optical beam deflecting element such that the optical beam deflecting element deflects the path of the at least one beam of light by an amount that is determined by the wavelength of the light beam; and varying the wavelength of at least one of the at least one beams of light such that the amount that the at least one beam of light is deflected by the optical beam deflecting element is varied to achieve control of the position of the spot at which the at least one beam of light is incident on the image plane in the slow scan direction.

2. The method of claim 1, wherein the wavelength of the at least one beam of light is varied by varying at least the electrical current applied to a control region of a laser device which generates the at least one beam of light.

3. In an optical output system wherein a beam of light is generated and focused to a spot on an image plane, a method of positioning the spot so as to compensate for slow scan direction spot position error, comprising the steps of:

generating a beam of light;

deflecting the beam of light by way of an optical beam deflecting element such that the optical beam deflecting element deflects the path of the beam of light by an amount that is determined by the wavelength of the light beam;

determining the existence and extent of error, if any, in the slow scan direction position of the spot on the image plane;

generating a signal which is proportional to the determined existence and extent of error in the slow scan direction position of the spot; and varying the wavelength of the beam of light by an amount which is determined, at least in part, by the signal, such that the amount that the beam of light is deflected by the optical beam deflecting element is varied to achieve correction of the positional error in the slow scan direction.

4. The method of claim 3, wherein the wavelength of the beam of light is varied by varying at least the electrical current applied to a control region of a laser device which generates the beam of light.

5. In an optical output system wherein a beam of light is generated and focused to a spot on an image plane, and further wherein the spot is scanned in a raster fashion across the image plane, a method of positioning the spot on the image plane so as to compensate for recurrent slow scan direction spot position error introduced by the various elements of the optical output system, comprising the steps of:

determining the existence and extent of recurrent slow scan direction spot position error;

storing in a memory apparatus data from which a signal may be generated which may be applied to correct for the recurrent slow scan direction spot position error; and, for each scan line, determining whether the spot position is one which must be corrected;

generating a beam of light at a first wavelength if the spot position is one which need not be corrected, and generating a beam of light at a second wavelength, determined at least in part by the signal generated by the stored data, if the spot position is one which must be corrected; and deflecting the beam of light by way of an optical beam deflecting element such that the optical beam deflecting element deflects the path of the beam of light by an amount that is determined by the wavelength of the light beam, and further such that at the second wavelength of light the beam of light is deflected by the optical beam deflecting element an amount sufficient to correctly position the spot in the slow scan direction on the image plane.

6. The method of claim 5, wherein the beam of light at both the first and second wavelengths are generated by a laser device, and wherein the method further comprises the step of varying at least the electrical current applied to a control region of a laser device so as to select between the first and second wavelengths.

7. The method of claim 5, further comprising the step of:

determining the existence and extent of further error, if any, in the slow scan direction position of the spot on the image plane after generating the beam of light at either the first or second wavelength;

generating a further signal which is proportional to the determined existence and extent of the further error in the slow scan direction position of the spot; and varying the wavelength of the beam of light by an amount which is determined, at least in part, by the further signal, such that the amount that the beam of light is deflected by the optical beam deflecting element is further varied to achieve correction of the positional error in the slow scan direction.

* * * * *